United States Patent
Ohmi

(10) Patent No.: US 9,123,146 B2
(45) Date of Patent: Sep. 1, 2015

(54) STEREOSCOPIC IMAGE DISPLAY CONTROL APPARATUS, AND STEREOSCOPIC IMAGE DISPLAY CONTROL METHOD

(71) Applicant: PANASONIC CORPORATION, Osaka (JP)

(72) Inventor: Shinichiro Ohmi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 309 days.

(21) Appl. No.: 13/721,815

(22) Filed: Dec. 20, 2012

(65) Prior Publication Data

US 2013/0194253 A1 Aug. 1, 2013

Related U.S. Application Data

(63) Continuation of application No. PCT/JP2012/003763, filed on Jun. 8, 2012.

(30) Foreign Application Priority Data

Jan. 27, 2012 (JP) ................................ 2012-015189

(51) Int. Cl.
*G06T 15/00* (2011.01)
*G06T 17/00* (2006.01)
(Continued)

(52) U.S. Cl.
CPC ................ *G06T 19/00* (2013.01); *H04N 13/00* (2013.01); *H04N 13/0022* (2013.01)

(58) Field of Classification Search
CPC combination set(s) only.
See application file for complete search history.

(56) References Cited

U.S. PATENT DOCUMENTS 6,313,866 B1 11/2001 Akamatsu et al.
7,636,088 B2 12/2009 Nomura et al.
(Continued)

FOREIGN PATENT DOCUMENTS

JP 11-113028 A 4/1999
JP 2004-333661 A 11/2004
(Continued)

OTHER PUBLICATIONS

"3DC Safety Guidelines for Dissemination of Human-friendly 3D," 3D Consortium (3DC) Safety/Guidelines Section, Revised on Apr. 20, 2010, w/ English translation.
(Continued)

*Primary Examiner* — Leon T Cain, II
(74) *Attorney, Agent, or Firm* — McDermott Will & Emery LLP

(57) ABSTRACT

A 3D tablet terminal (100) which is an example of a stereoscopic image display control apparatus includes: a most projecting position determination unit (104) which determines a most projecting position at which an object projects most from a display surface and a most receding position at which the object recedes most therefrom; and a display control unit (105) which causes a display device to display the object, wherein the display control unit (105) adjusts a display position of the object so that an amount of projection at the most projecting position is equal to a proper amount of projection, and processes, by a predetermined method, a portion of the object on a far side relative to the display surface when an amount of recession at the most receding position after adjusting the display position exceeds a proper amount of recession.

9 Claims, 11 Drawing Sheets

(51) Int. Cl.
*G06T 19/00* (2011.01)
*H04N 13/00* (2006.01)

(56) References Cited

U.S. PATENT DOCUMENTS

| | | | |
|---|---|---|---|
| 7,889,196 | B2 | 2/2011 | Nomura et al. |
| 2006/0192776 | A1 | 8/2006 | Nomura et al. |
| 2010/0039499 | A1 | 2/2010 | Nomura et al. |
| 2010/0039504 | A1 | 2/2010 | Takahashi et al. |
| 2010/0053308 | A1* | 3/2010 | Namii et al. ............. 348/47 |
| 2011/0193945 | A1 | 8/2011 | Tsuchida |
| 2011/0242297 | A1* | 10/2011 | Yamada ............. 348/54 |
| 2011/0304714 | A1 | 12/2011 | Akifusa et al. |
| 2012/0120210 | A1 | 5/2012 | Yamada |
| 2012/0176370 | A1* | 7/2012 | Imai et al. ............. 345/419 |

FOREIGN PATENT DOCUMENTS

| | | |
|---|---|---|
| JP | 2004-349736 A | 12/2004 |
| JP | 2006-262191 A | 9/2006 |
| JP | 2011-166285 A | 8/2011 |
| JP | 2011-211657 A | 10/2011 |
| JP | 2012-004663 A | 1/2012 |
| WO | WO-2011/114739 A1 | 9/2011 |

OTHER PUBLICATIONS

International Search Report issued in International Patent Application No. PCT/JP2012/003763 dated Jul. 10, 2012.

* cited by examiner

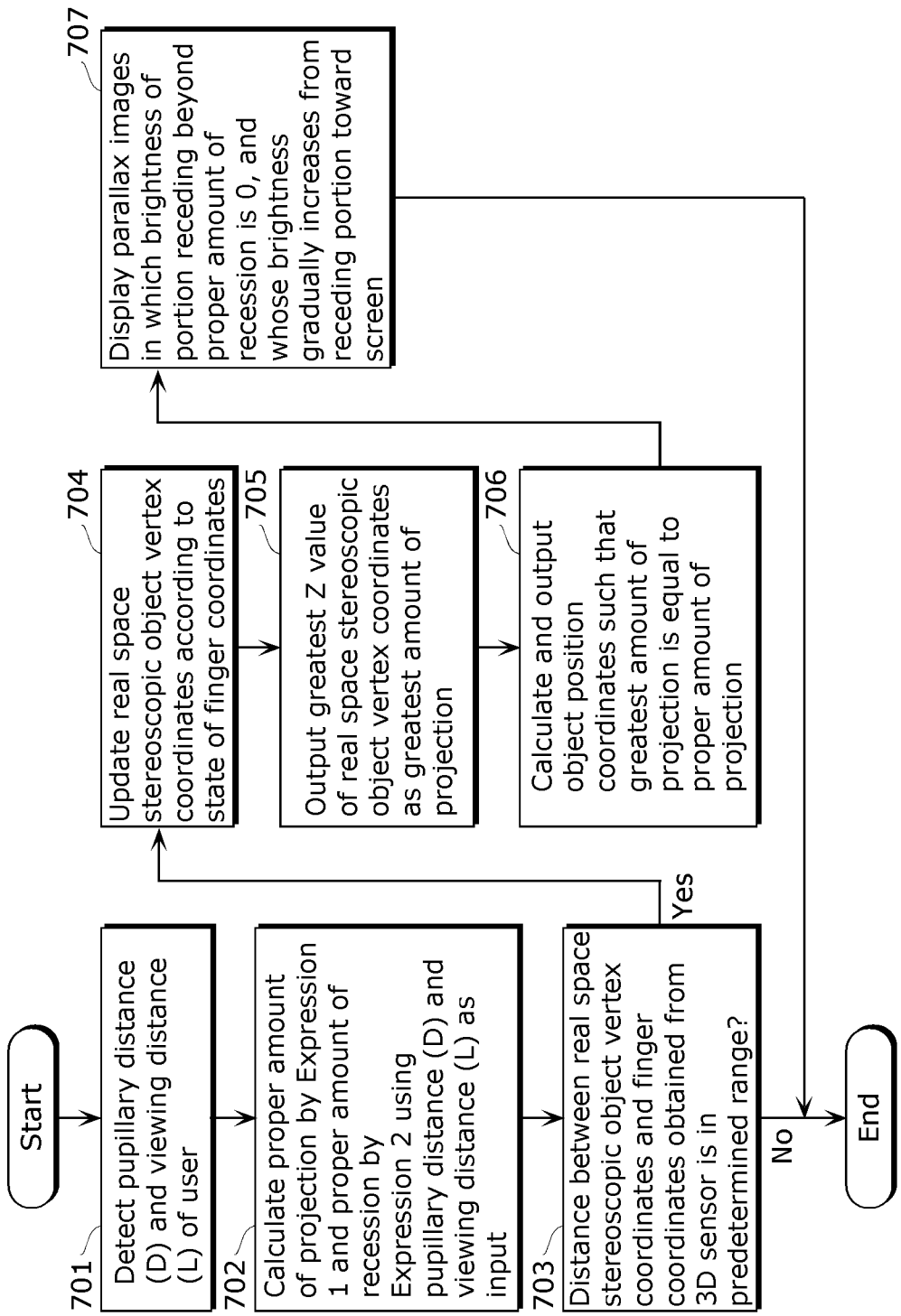

STEREOSCOPIC IMAGE DISPLAY CONTROL APPARATUS, AND STEREOSCOPIC IMAGE DISPLAY CONTROL METHOD

CROSS REFERENCE TO RELATED APPLICATION

This is a continuation application of PCT International Application No. PCT/JP2012/003763 filed on Jun. 8, 2012, designating the United States of America, which is based on and claims priority of Japanese Patent Application No. 2012-015189 filed on Jan. 27, 2012. The entire disclosures of the above-identified applications, including the specifications, drawings and claims are incorporated herein by reference in their entirety.

FIELD

One or more exemplary embodiments disclosed herein relate generally to stereoscopic image display control apparatuses which control stereoscopic displays of objects.

BACKGROUND

In recent years, the three-dimensional (3D) market in the mobile field has being rapidly expanding, and the proportion of autostereoscopic 3D mobile terminals to the entire market is predicted to constitute about 12%. The number of autostereoscopic 3D mobile terminals is predicted to increase by 130 million from 2011 to 2015, and it is expected that more and more tablet terminals having future potential will adopt 3D autostereoscopy.

Tablet terminals are generally small in size, and thus a touch input method is adopted for inputting information by a user touching a screen part of a graphical user interface (GUI) such as an icon displayed on the display using a touch pen or his or her finger. In the touch input method, screen parts which include a plurality of icons are displayed on the display screen, and the user can select an icon by touching such a screen part using a touch pen or his or her finger, thereby activating an application program assigned to the icon.

In addition, an input operation is now being three dimensionally performed along with the 3D display of images. Specifically, it is now conceivable that 3D objects displayed in space are directly controlled (touched) with a finger.

Patent Literature (PTL) 1 discloses, for instance, a stereoscopic video display method for a plurality of viewpoints, with which adults can enjoy stereoscopic video content together with children without worrying about safety of the children's eyes.

CITATION LIST

Patent Literature

[PTL 1] Japanese Unexamined Patent Application Publication No. 2006-262191

Non Patent Literature

[NPL 1] 3DC Safety Guidelines for Dissemination of Human-friendly 3D (Revised on Apr. 20, 2010, 3D Consortium)

SUMMARY

Technical Problem

When stereoscopically viewed 3D objects are displayed, fatigue and discomfort of viewers, for instance, can be reduced by conforming with the guidelines of NPL 1 open to the public in the website of the 3D Consortium (3DC) safety/guidelines section (http://www.3dc.gr.jp/jp/scmt_wg_rep/3dc_guideJ_20111031.pdf) (hereinafter, simply referred to as "Safety Guidelines").

For example, NPL 1 discloses that about 5 cm is the limit of the amount of projection in 3D display when a pupillary distance is 6.5 cm and a viewing distance between a viewer and a screen is 45 cm (the limit of the amount of recession is also almost the same).

If it is taken into consideration that rotational operation is performed on a 3D object, a method is adopted for making a 3D object smaller than a cube having about 10 cm sides so as to allow the 3D object to be operated while following the Security Guidelines. In this case, a restriction is imposed that the 3D object needs be smaller than the cube as described above.

In the case where an object projects out and recedes into distance beyond the restriction, an attempt to overcome the safety problem by cutting away the portions of the 3D object that do not conform with the Safety Guidelines will result in an unnatural image.

One non-limiting and exemplary embodiment provides a stereoscopic image display control apparatus capable of naturally displaying 3D objects without being under restrictions on the object size.

Solution to Problem

A stereoscopic image display control apparatus according to one or more exemplary embodiments disclosed herein stereoscopically displays an object within a range between proper amounts of projection and recession from a display surface of a display device. Specifically, the stereoscopic image display control apparatus includes: a most projecting position determination unit configured to determine a most projecting position at which the object projects most from the display surface and a most receding position at which the object recedes most from the display surface; and a display control unit configured to cause the display device to display the object. The display control unit is configured to: adjust a display position of the object until an amount of projection at the most projecting position is equal to the proper amount of projection; and process, by a predetermined method, a portion of the object on a far side relative to the display surface when an amount of recession at the most receding position after adjusting the display position exceeds the proper amount of recession.

These general and specific aspects may be implemented using a system, a method, an integrated circuit, a computer program, or a recording medium, or any combination of systems, methods, integrated circuits, computer programs, or recording media.

Advantageous Effects

According to the techniques disclosed herein, a stereoscopic object can be naturally displayed without the limit of the size of the stereoscopic object.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a flowchart showing operation of the 3D tablet terminal according to the embodiment.

DESCRIPTION OF EMBODIMENT

Figure 1:
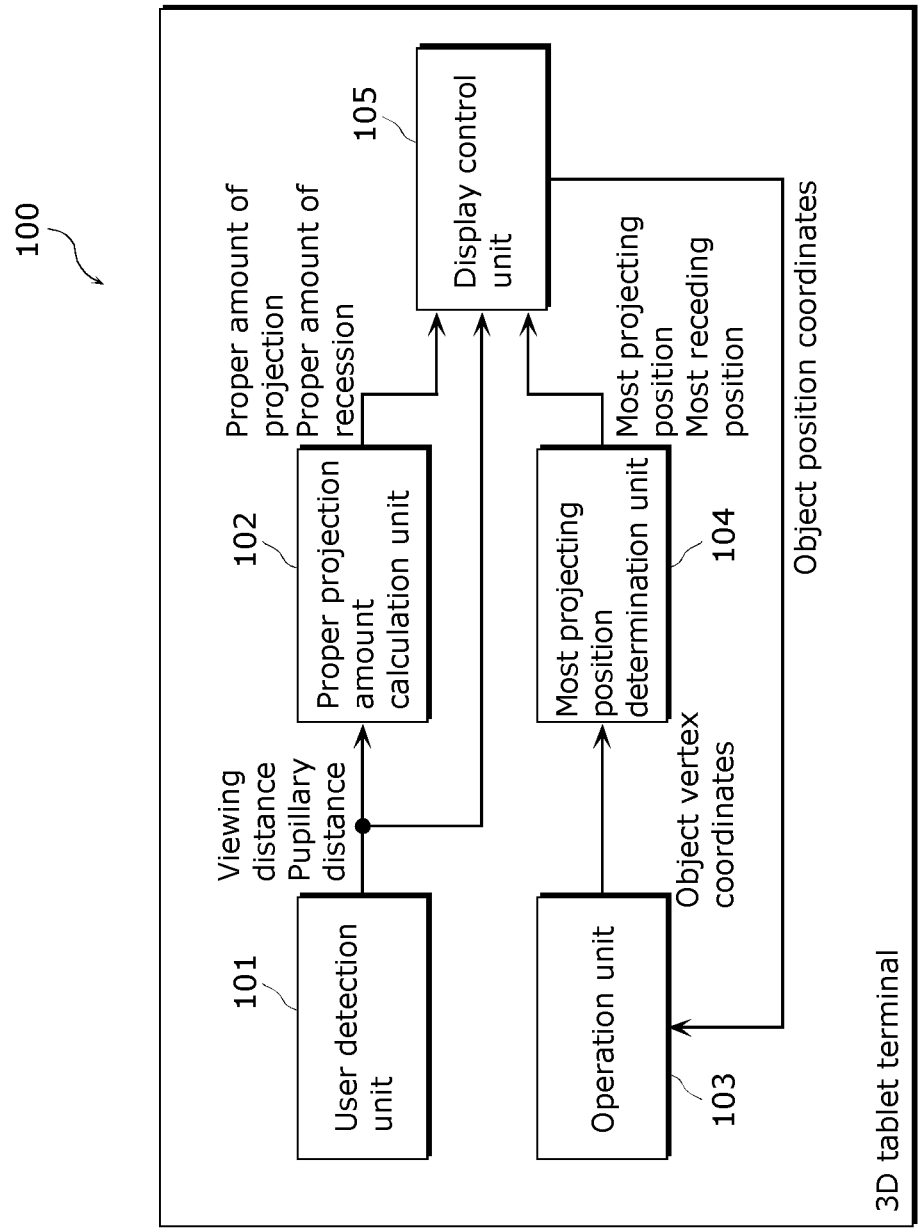
FIG. 1 illustrates control configuration of a 3D tablet terminal according to an embodiment.

A stereoscopic image display control apparatus according to one or more exemplary embodiments disclosed herein stereoscopically displays an object within a range between proper amounts of projection and recession from a display surface of a display device. Specifically, the stereoscopic image display control apparatus includes: a most projecting position determination unit configured to determine a most projecting position at which the object projects most from the display surface and a most receding position at which the object recedes most from the display surface; and a display control unit configured to cause the display device to display the object. The display control unit is configured to: adjust a display position of the object until an amount of projection at the most projecting position is equal to the proper amount of projection; and process, by a predetermined method, a portion of the object on a far side relative to the display surface when an amount of recession at the most receding position after adjusting the display position exceeds the proper amount of recession.

According to the above configuration, the object can be in the appropriate range (the range between the proper amount of projection and the proper amount of recession) by performing predetermined processing on the portion on the far side and not cutting away the portion of on the near side of the object. As a result, the stereoscopic object can be naturally displayed without limiting the size of the stereoscopic object.

Furthermore, the stereoscopic image display control apparatus may further includes an operation unit configured to accept input of an operation on the object displayed by the display device. The display control unit may be configured to: adjust the display position of the object until the amount of projection at the most projecting position of the object on which the operation accepted by the operation unit is reflected is equal to the proper amount of projection; and process, by the predetermined method, the portion of the object on the far side relative to the display surface when the amount of recession at the most receding position after adjusting the display position exceeds the proper amount of recession.

Accordingly, even when the object changes (moves, rotates, is enlarged, is reduced, or the like), the stereoscopic object can be naturally displayed without limiting the size of the object. It should be noted that the time when the above display control is performed by the display control unit is not limited to the time at which the object is operated.

As an example, when the amount of recession at the most receding position exceeds the proper amount of recession, the display control unit may be configured to process the object, to gradually lower brightness of the portion on the far side relative to the display surface as the amount of recession increases and cause brightness at a position of the proper amount of recession to be 0.

As another example, when the amount of recession at the most receding position exceeds the proper amount of recession, the display control unit may be configured to process the object, to gradually increase transparency of the portion on the far side relative to the display surface as the amount of recession increases and cause transparency at a position of the proper amount of recession to be 100%.

As yet another example, when the amount of recession at the most receding position exceeds the proper amount of recession, the display control unit may be configured to mix a background color into a color of the portion of the object on the far side relative to the display surface of the display device in such a manner that a ratio of the mixed background color gradually increases as the amount of recession increases, and is 100% at a position of the proper amount of recession.

The stereoscopic image display control apparatus may further include: a detection unit configured to detect a viewing distance between a viewer and the display device, and a pupillary distance of the viewer; and a proper projection amount calculation unit configured to calculate the proper amount of projection and the proper amount of recession, based on the viewing distance and the pupillary distance detected by the detection unit.

The stereoscopic image display control apparatus may further include: an input unit configured to accept input of an age from a viewer; and a proper projection amount calculation unit configured to calculate the proper amount of projection and the proper amount of recession, based on a size of the display surface of the display device and the age of the viewer accepted by the input unit.

The stereoscopic image display control apparatus may further include the display device.

As described above, the stereoscopic image display control apparatus may include a display device, or may control the display of an external display device.

A stereoscopic image display control method according to one or more exemplary embodiments disclosed herein is a method for stereoscopically displaying an object within a range between proper amounts of projection and recession from a display surface of a display device. Specifically, the stereoscopic image display control method includes: determining a most projecting position at which the object projects most from the display surface and a most receding position at which the object recedes most from the display surface; and causing the display device to display the object. When causing the display device to display the object, a display position of the object is adjusted until an amount of projection at the most projecting position is equal to the proper amount of projection; and a portion of the object on a far side relative to the display surface is processed by a predetermined method when an amount of recession at the most receding position after adjusting the display position exceeds the proper amount of recession.

These general and specific aspects may be implemented using a system, a method, an integrated circuit, a computer program, or a recording medium, or any combination of systems, methods, integrated circuits, computer programs, or recording media.

The following is a description of a 3D tablet terminal which is an example of the stereoscopic image display control apparatus according to one exemplary embodiment, with reference to the drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims. Therefore, among the structural elements in the following exemplary embodiments, structural elements not recited in any one of the independent claims are described as arbitrary structural elements.

Embodiment

Figure 2:
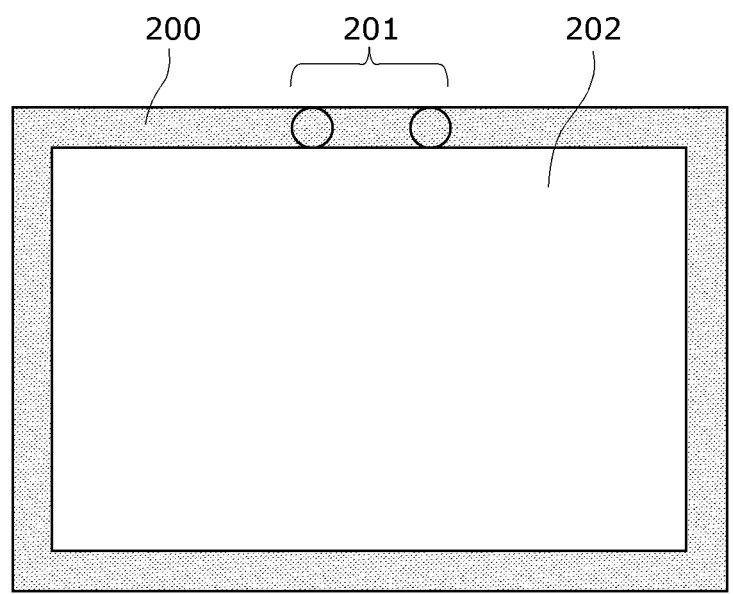
FIG. 2 is an external view of the 3D tablet terminal according to the embodiment.

FIG. 1 illustrates control configuration of a 3D tablet terminal 100 according to the present embodiment. FIG. 2 is an external view of a 3D tablet terminal 200 corresponding to the 3D tablet terminal 100 in FIG. 1.

The 3D tablet terminal 100 illustrated in FIG. 1 includes a user detection unit 101, a proper projection amount calculation unit 102, an operation unit 103, a most projecting position determination unit 104, and a display control unit 105.

The 3D tablet terminal 200 illustrated in FIG. 2 corresponds to the 3D tablet terminal 100 in FIG. 1, and includes a stereo camera 201 disposed at the upper part of the body with a predetermined space therebetween, and an autostereoscopic 3D display 202. The 3D tablet terminal 200 stereoscopically displays objects within the range between proper amounts of projection and recession from the display surface of the autostereoscopic 3D display 202.

It should be noted that the user detection unit 101 in FIG. 1 detects a user (viewer), using, for example, image data captured by the stereo camera 201 in FIG. 2. Further, the display control unit 105 in FIG. 1 causes the autostereoscopic 3D display 202 in FIG. 2 to display stereoscopic images, for example.

The user detection unit 101 detects the viewing distance and the pupillary distance of the user using a stereo imaging unit (CCD or CMOS sensor) disposed at the upper part of the display unit or the like. Specifically, an image of the head of the user is captured by the stereo camera 201 which is an example of the stereo imaging unit. Then, the user detection unit 101 performs image processing on each of a left image and a right image obtained from the stereo imaging unit to detect the user's eyes, and obtains, based on the right and left images, the spatial positions of the user's eyes using the triangulation method.

Accordingly, the pupillary distance of the user's eyes and the distance between the eyes and the stereo camera 201 serving as the stereo imaging unit (viewing distance) can be calculated. Here, "viewing distance" is defined as the distance between the display surface of the autostereoscopic 3D display 202 and the middle point of a line segment connecting the pupils of the user.

The proper projection amount calculation unit 102 calculates, using Expressions 1 and 2, a proper amount of projection (H) and a proper amount of recession (H') from the display surface of a stereoscopic object (which may be simply referred to as an "object") according to the user, based on the viewing distance (L) of the user and the pupillary distance (D) of the user. Then, the proper projection amount calculation unit 102 outputs the calculated proper amount of projection (H) and the calculated proper amount of recession (H') to the display control unit 105.

The detailed derivation methods using Expressions 1 and 2 are described below. Here, the proper amount of projection (H) is the maximum value of the proper amount of projection which satisfies the Safety Guidelines (NPL 1), for example. Furthermore, the proper amount of recession (H') is the maximum value of the proper amount of recession which satisfies the Safety Guidelines, for example.

[Math 1]
$$H = L - \frac{D}{2\tan\left\{\tan^{-1}\left(\frac{D}{2L}\right) + \frac{\pi}{360}\right\}} \qquad \text{Expression 1}$$

[Math 2]
$$H' = \frac{D}{2\tan\left\{\tan^{-1}\left(\frac{D}{2L}\right) - \frac{\pi}{360}\right\}} - L \qquad \text{Expression 2}$$

It should be noted that the methods of calculating a proper amount of projection and a proper amount of recession are not limited to the above examples. Thus, a proper amount of projection and a proper amount of recession may be calculated based on parameters other than the viewing distance (L) and the pupillary distance (D) of the user. Furthermore, the 3D tablet terminal 100 may previously hold a proper amount of projection and a proper amount of recession as fixed values. In that case, the proper projection amount calculation unit 102 does not need to be included.

The operation unit 103 accepts, from the user, an operation on (enlarging, reducing, rotating, or moving, for instance) a stereoscopic object displayed by the autostereoscopic 3D display 202, and outputs, to the most projecting position determination unit 104, vertex coordinate data of the stereoscopic object on which the accepted operation is reflected.

It should be noted that here, an example of a stereoscopic object is assumed to be a polyhedron such as a cube. For this reason, the operation unit 103 outputs vertex coordinate data of the stereoscopic object on which the operation is reflected. However, a method for identifying a stereoscopic object is not limited to this. For example, if a stereoscopic object is a sphere, the operation unit 103 may output data for determining the center coordinates and its radius. In addition, even if the stereoscopic object has a more complicated shape, data for determining a best-suited stereoscopic object can be outputted by applying 3D computer graphics (CG) technique.

As an example of a specific method of detecting a "user operation", the operation unit 103 detects spatial positions of two fingertips of the user using the stereo camera 201, and measures a time during which the detected two fingertips of the user are in contact with the stereoscopic object, for example.

Then, if the operation unit 103 determines that two fingertips of the user are in contact with the stereoscopic object for a predetermined time or longer (contact mode), the operation unit 103 substitutes the direction in which two fingertips of the user move and the amount of the movement after the determination for the rotational direction and the amount of rotation of the stereoscopic object, for example.

In addition, when in the contact mode, the operation unit 103 determines that extension of the distance between the two fingertips of the user indicates an operation of enlarging the size of a stereoscopic object, whereas the operation unit 103 determines that shortening the distance indicates reducing the size of the stereoscopic object, and substitutes the amount of change in the distance between two fingertips for the enlargement ratio (reduction ratio). Furthermore, the operation unit 103 cancels the contact mode when two fingertips of the user come apart from the stereoscopic object.

It should be noted that here "contact" does not mean that a stereoscopic object and two fingertips of the user are in physical contact. This is because the autostereoscopic 3D display 202 merely displays a stereoscopic object to the user as if the object is present there.

The most projecting position determination unit 104 determines the most projecting position and the most receding position of a stereoscopic object on which the operation outputted from the operation unit 103 is reflected, using vertex coordinate data of the resultant stereoscopic object.

Specifically, if a stereoscopic object is a cube, for example, the most projecting position determination unit 104 calculates the amount of projection and the amount of recession at each vertex, and determines the vertex at which the amount of projection is the greatest as a most projecting position (the amount of projection at this vertex is defined as the "greatest amount of projection"), whereas the most projecting position determination unit 104 determines the vertex at which the amount of recession is the greatest as the most receding position (the amount of recession at this vertex is defined as the "greatest amount of recession").

The display control unit 105 generates parallax images for displaying a stereoscopic object from various types of inputted information, and displays the stereoscopic object using the autostereoscopic 3D display 202. Specifically, the display control unit 105 obtains the viewing distance and the pupillary distance from the user detection unit 101, obtains a proper amount of projection and a proper amount of recession from the proper projection amount calculation unit 102, and obtains the most projecting position (the greatest amount of projection) and the most receding position (the greatest amount of recession) from the most projecting position determination unit 104. The detailed method of generating parallax images is described below.

Figure 3:
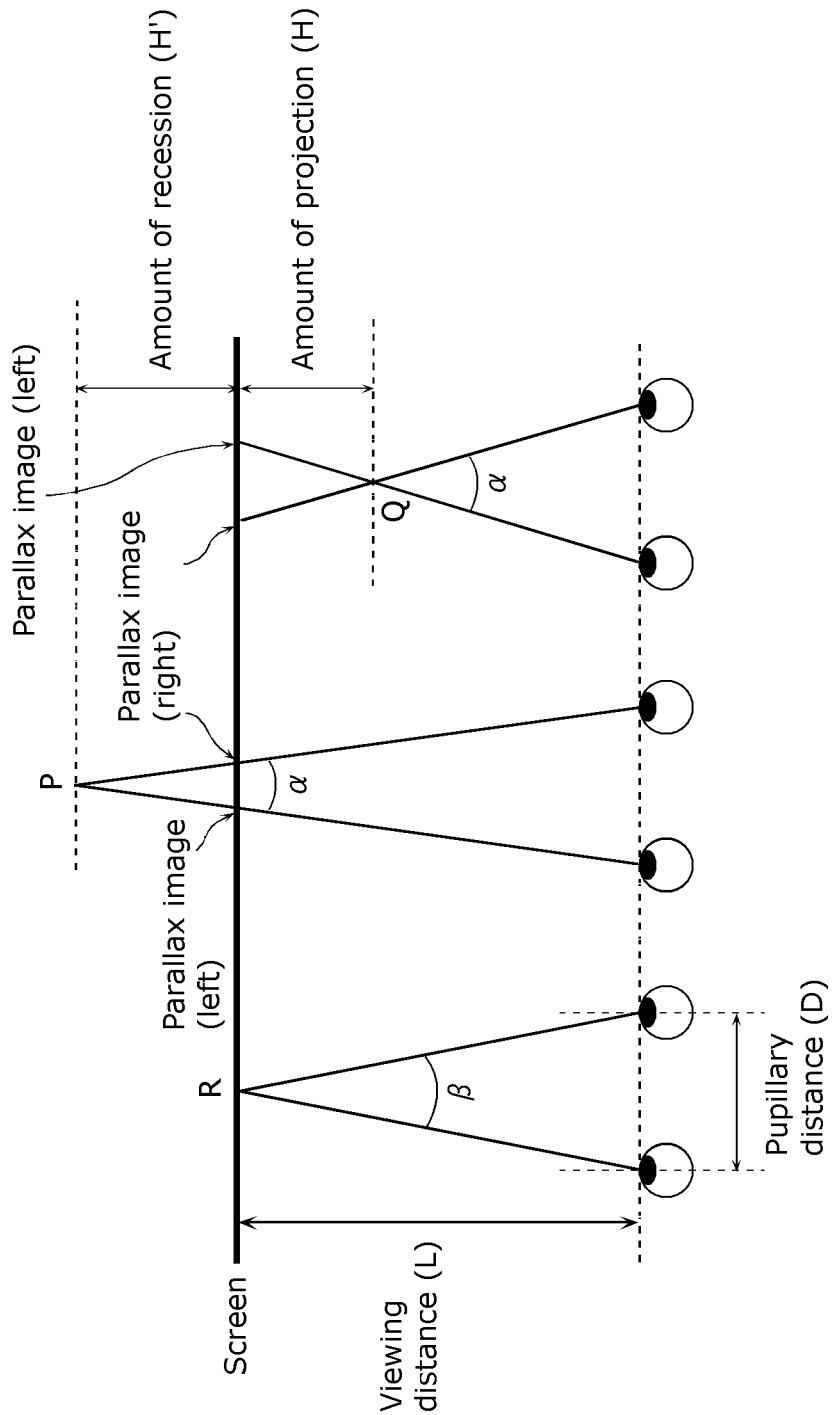
FIG. 3 is a diagram for describing the principle of stereoscopy.

Now, FIG. 3 illustrates a basic principle of stereoscopic display. FIG. 3 illustrates the positional relationship between a screen and the eyes of users when viewed from above. Right and left parallax images are displayed on the screen, thereby allowing the users to see a stereoscopic object at point P or Q. The angle formed by line segments connecting point P or Q to the right and left pupils of each user is convergence angle α. Furthermore, the angle formed by line segments connecting point R on the screen to the right and left pupils of the user is convergence angle β. Furthermore, □α-β□ is referred to as a parallax angle.

The Safety Guidelines show that safety is secured if the parallax angle is 1° or less. In view of this, when a stereoscopic object is displayed by the 3D tablet terminal 100 according to the present embodiment, the parallax angle is set within this range.

Accordingly, the proper projection amount calculation unit 102 calculates a proper amount of projection (H) and a proper amount of recession (H') based on the pupillary distance (D) and the viewing distance (L) of a user such that the parallax angle is 1°.

Specifically, Expression 1 for deriving the proper amount of projection (H) is derived based on Expressions 3 to 9. As illustrated in FIG. 3, convergence angle β formed by line segments connecting point R on the screen to the right and left pupils of the user is calculated using Expression 3. Furthermore, convergence angle α formed by line segments connecting point Q to the right and left pupils of users is calculated using Expression 4.

Here, in the case of Expression 5, the parallax angle (α-β) is obtained using Expression 6. When the parallax angle (α-β) is 1°, the amount of projection is the greatest in the proper range (proper amount of projection (H)). Next, x will be obtained using Expression 7 when the parallax angle (α-β) is 1° in Expression 6. Expression 8 can be obtained from Expressions 5 and 7. If Expression 8 is solved for the proper amount of projection (H), Expression 9, namely, Expression 1 will be derived.

[Math 3]

$$\tan^{-1}\left(\frac{\frac{D}{2}}{L}\right) = \frac{\beta}{2}$$

$$\beta = 2\tan^{-1}\left(\frac{D}{2L}\right)$$

Expression 3

[Math 4]

$$\tan^{-1}\left(\frac{\frac{D}{2}}{L-H}\right) = \frac{\alpha}{2}$$

$$\alpha = 2\tan^{-1}\left\{\frac{D}{2(L-H)}\right\}$$

Expression 4

[Math 5]

$$x = \frac{D}{2(L-H)}$$

Expression 5

[Math 6]

$$\alpha - \beta = 2\tan^{-1}(x) - 2\tan^{-1}\left(\frac{D}{2L}\right) = \frac{\pi}{180}$$

Expression 6

[Math 7]

$$\tan^{-1}(x) = \tan^{-1}\left(\frac{D}{2L}\right) + \frac{\pi}{360}$$

$$x = \tan\left\{\tan^{-1}\left(\frac{D}{2L}\right) + \frac{\pi}{360}\right\}$$

Expression 7

[Math 8]

$$\frac{D}{2(L-H)} = \tan\left\{\tan^{-1}\left(\frac{D}{2L}\right) + \frac{\pi}{360}\right\}$$

Expression 8

[Math 9]

$$H = L - \frac{D}{2\tan\left\{\tan^{-1}\left(\frac{D}{2L}\right) + \frac{\pi}{360}\right\}}$$

Expression 9

Similarly, Expression 2 for deriving the proper amount of recession (H') is derived based on Expressions 3 and 10 to 15. As illustrated in FIG. 3, convergence angle β formed by line segments connecting point R on the screen to the right and left pupils of the user is calculated using Expression 3. Furthermore, convergence angle α formed by line segments connecting point P to the right and left pupils of the users is calculated using Expression 10.

Here, in the case of Expression 11, the parallax angle (α-β) is obtained using Expression 12. When the parallax angle (α−β) is −1°, the amount of recession is the greatest in the proper range (proper amount of recession (H')). Next, x' will be obtained using Expression β when the parallax angle (α−β) is −1° in Expression 12. Expression 14 can be obtained from Expressions 11 and 13. If Expression 14 is solved for the proper amount of recession (H'), Expression 15, namely, Expression 2 will be derived.

[Math 10]

$$\left.\begin{array}{l}\tan^{-1}\left(\dfrac{\dfrac{D}{2}}{L+H'}\right)=\dfrac{\alpha}{2}\\ \alpha=2\tan^{-1}\left\{\dfrac{D}{2(L+H')}\right\}\end{array}\right\} \quad \text{Expression 10}$$

[Math 11]

$$x'=\dfrac{D}{2(L+H')} \quad \text{Expression 11}$$

[Math 12]

$$\alpha-\beta=2\tan^{-1}(x')-2\tan^{-1}\left(\dfrac{D}{2L}\right)=-\dfrac{\pi}{180} \quad \text{Expression 12}$$

[Math 13]

$$\left.\begin{array}{l}\tan^{-1}(x')=\tan^{-1}\left(\dfrac{D}{2L}\right)-\dfrac{\pi}{360}\\ x'=\tan\left\{\tan^{-1}\left(\dfrac{D}{2L}\right)-\dfrac{\pi}{360}\right\}\end{array}\right\} \quad \text{Expression 13}$$

[Math 14]

$$\dfrac{D}{2(L+H')}=\tan\left\{\tan^{-1}\left(\dfrac{D}{2L}\right)-\dfrac{\pi}{360}\right\} \quad \text{Expression 14}$$

[Math 15]

$$H'=\dfrac{D}{2\tan\left\{\tan^{-1}\left(\dfrac{D}{2L}\right)-\dfrac{\pi}{360}\right\}}-L \quad \text{Expression 15}$$

Figure 4:
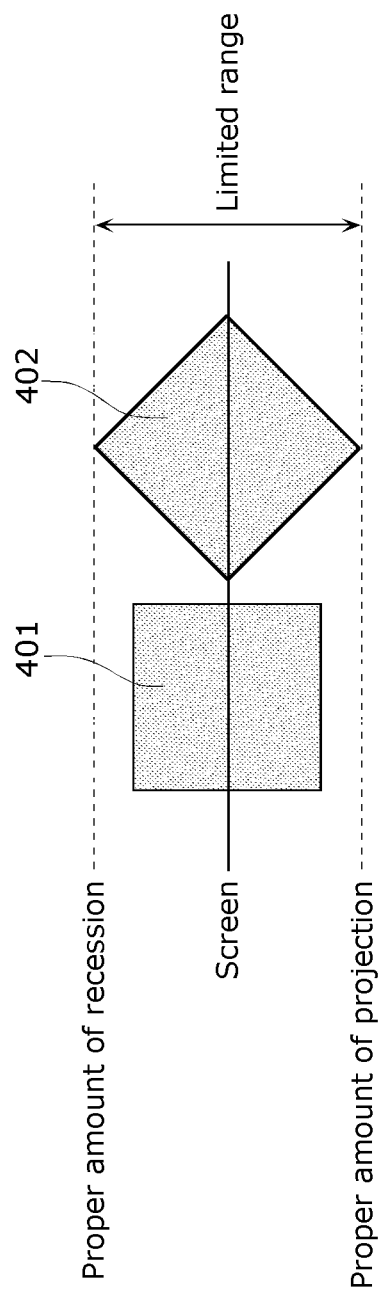
FIG. 4 illustrates examples of stereoscopic objects within a limited range.

The limited range is obtained by adding the proper amount of projection (H) and the proper amount of recession (H'). Thus, as illustrated in FIG. 4, both a stereoscopic object 401 before rotation and a stereoscopic object 402 after rotation need to be in the limited range. In the examples of FIG. 4, the size of the stereoscopic object 401 before rotation is sufficiently small relative to the limited range so that the stereoscopic object 402 after rotation is in the limited range, or specifically, the stereoscopic object 402 after rotation satisfies the Safety Guidelines.

Figure 5:
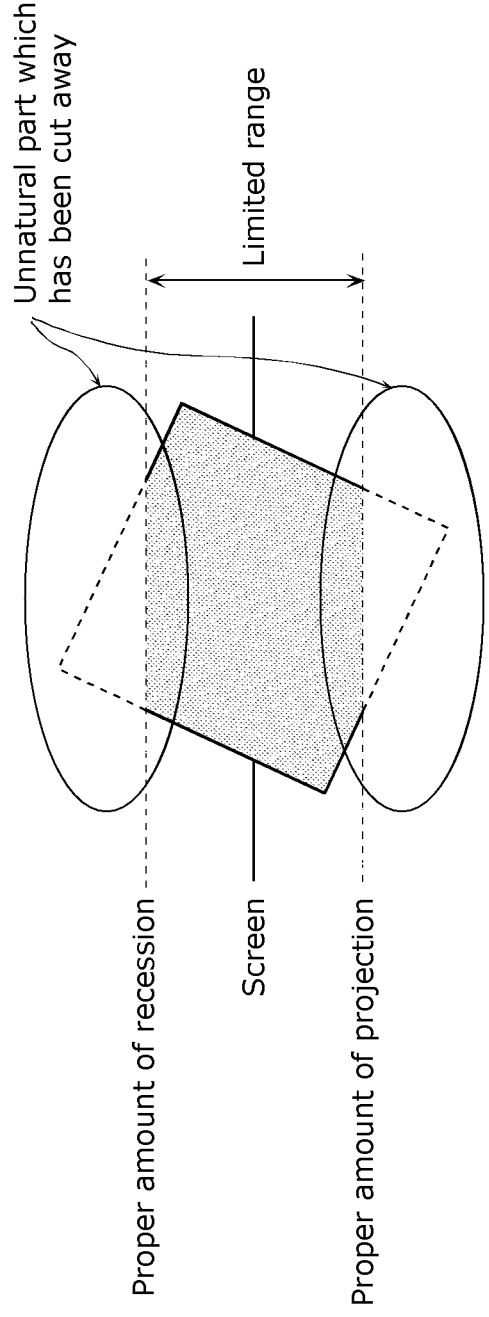
FIG. 5 illustrates an example in which portions of a stereoscopic object beyond the limited range are cut away.

Furthermore, FIG. 5 illustrates an example in which portions of the stereoscopic object beyond the limited range are cut away instead of allowing the size of the stereoscopic object to be unlimited (beyond the limited range). In this case, an unnatural part may be generated by cutting away portions of the stereoscopic object (a portion on the near side beyond the proper amount of projection and a portion on the far side beyond the proper amount of recession).

Figure 8:
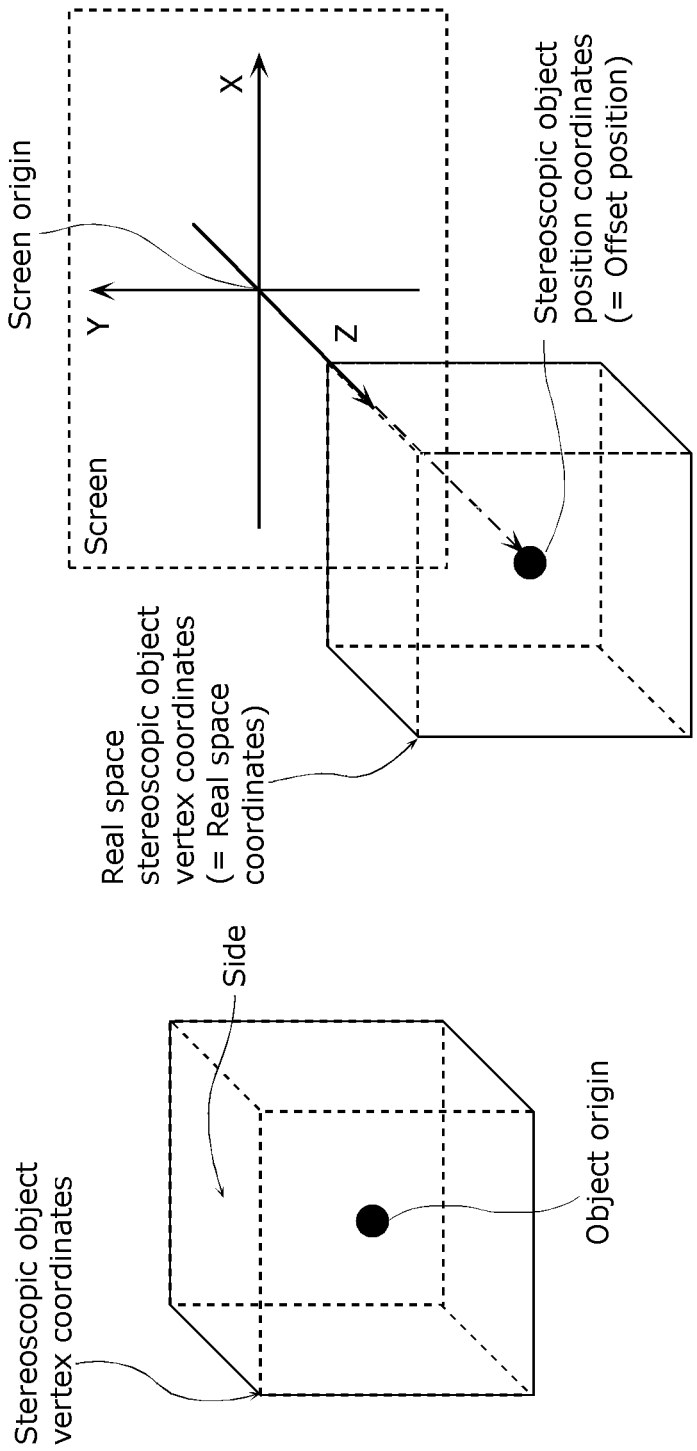
FIG. 8 illustrates names of portions of a stereoscopic object defined in the specification.

Next is a description, with reference to FIGS. 6A to 6D, 7, and 8, of the operation of the stereoscopic image display control apparatus according to the present disclosure. FIGS. 6A to 6D illustrate examples of stereoscopic objects displayed by the autostereoscopic 3D display 202 in FIG. 2. FIG. 7 is a flowchart showing operation of the stereoscopic image display control apparatus (3D tablet terminal). FIG. 8 is a diagram for describing the name of each part of a stereoscopic object defined in this specification.

First, the user detection unit 101 detects the right and left pupils of a user from images captured by the stereo camera 201, and detects the pupillary distance (D) and the viewing distance (L) of the user by the triangulation method using image processing. The user detection unit 101 outputs the obtained data to the proper projection amount calculation unit 102 and the display control unit 105 (step S701).

Next, the proper projection amount calculation unit 102 calculates a proper amount of projection (H) by Expression 1 using the pupillary distance (D) and the viewing distance (L) obtained from the user detection unit 101, calculates a proper amount of recession (H') by Expression 2, and outputs the obtained amounts to the display control unit 105 (step S702).

It should be noted that the stereoscopic object includes, for example, vertex coordinates based on an object origin (the center of gravity of the cube in the example in FIG. 8) serving as the origin (stereoscopic object vertex coordinates), and sides determined by a plurality of vertexes, as illustrated in FIG. 8. In addition, an offset position of the object origin with respect to a screen origin (which is assumed to be the center of the display surface of the autostereoscopic 3D display 202) is given as stereoscopic object position coordinates.

Therefore, with regard to real space coordinates based on the screen origin which is the center of the display surface of the autostereoscopic 3D display 202, real space stereoscopic object vertex coordinates obtained by adding stereoscopic object position coordinates to stereoscopic object vertex coordinates indicate vertex coordinates of the stereoscopic object.

Next, the operation unit 103 has a 3D sensor which includes the stereo camera 201, and processes captured images of a finger of the user, thereby detecting finger coordinates of the user in the real space coordinate system. Various methods of detecting finger coordinates of a user in the real space coordinate system may be used.

Then, the operation unit 103 obtains the distance between the detected finger coordinates of the user in the real space coordinate system and each of plural sets of real space stereoscopic object vertex coordinates of the stereoscopic object, and determines whether the distance is in the predetermined range (step S703).

If the distance between the finger coordinates of the user and any set of the real space stereoscopic object vertex coordinates of the stereoscopic object is in the predetermined range (Yes in step S703), the operation unit 103 determines that the finger of the user is in contact with the stereoscopic object. Then, the operation unit 103 determines the operation of the user on the stereoscopic object by continuously detecting finger coordinates of the user in the real space coordinate system, and controls the stereoscopic object according to the determination result.

For example, if the operation unit 103 determines that the distance between finger coordinates of two fingers of the user in the real space coordinate system extends, the operation unit 103 performs control so as to enlarge the stereoscopic object according to the amount of the movement (the amount of extension), and outputs real space stereoscopic object vertex coordinates after reflecting the enlarging operation, to the most projecting position determination unit 104 (step S704).

Figure 6A:
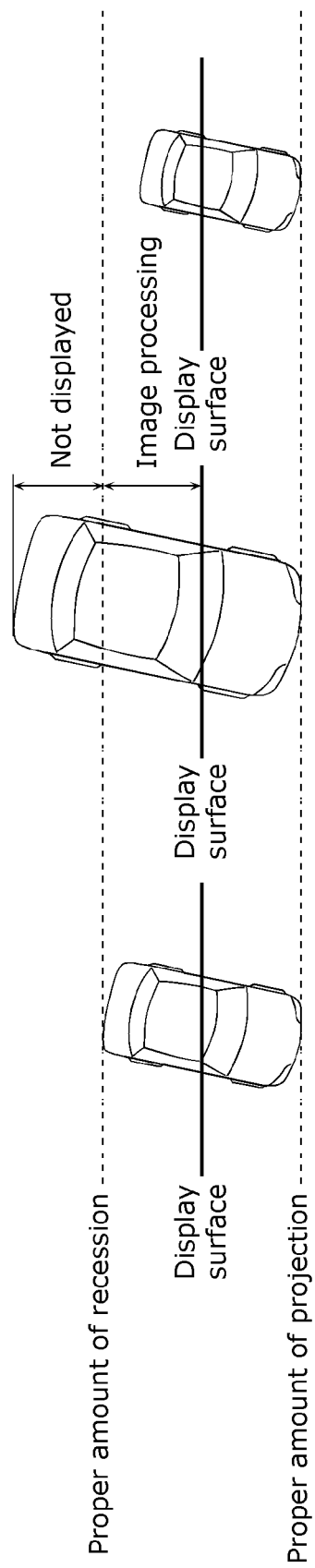
FIG. 6A is a conceptual diagram of stereoscopic objects displayed by an autostereoscopic 3D display when viewed from above.
Figure 6B:
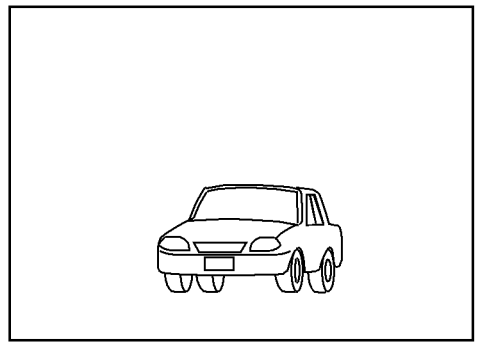
FIG. 6B illustrates a state in which the stereoscopic object on the left in FIG. 6A is displayed as an autostereoscopic 3D object.

The drawing on the left in FIG. 6A and FIG. 6B illustrate examples of a stereoscopic object displayed by the autostereoscopic 3D display 202. Specifically, the drawing on the left in FIG. 6A is a conceptual diagram of a stereoscopic object displayed by the autostereoscopic 3D display 202 when viewed from above. FIG. 6B illustrates an example of the display by the autostereoscopic 3D display 202.

In this example, a car which is an example of a stereoscopic object is displayed by the autostereoscopic 3D display 202. More specifically, the amount of projection of the left front corner of the car (the most projecting position) is equal to the proper amount of projection, and the amount of projection at the right rear corner of the car (the most receding position) is equal to the proper amount of recession.

Then, if the operation unit 103 determines that space between two fingers of the user increases by a predetermined amount while the two fingers are in contact with the car, the operation unit 103 calculates real space stereoscopic object vertex coordinates of the enlarged car as illustrated in the center of FIG. 6A, and outputs the calculated coordinates to the most projecting position determination unit 104.

It should be noted that the operation on the stereoscopic object may includes processing such as rotation, movement, and reduction, in addition to enlargement. In the present embodiment, distances between finger coordinates of the user in the real space coordinate system and plural sets of real space stereoscopic object vertex coordinates of the stereoscopic object are used in the determination as to whether a finger of the user is in contact with the stereoscopic object. However, distances between finger coordinates of the user in the real space coordinate system and plural sides which form the stereoscopic object may be used.

It should be noted that the operation unit 103 may have various configurations, other than accepting operation on the stereoscopic object through the contact between the finger of the user and the stereoscopic object in real space. For example, a configuration may be adopted in which the user is allowed to operate a stereoscopic object by touching a touch panel attached to the display surface of the autostereoscopic 3D display 202. Alternatively, a configuration may be adopted in which the user is allowed to operate a stereoscopic object by pressing a physical button provided on the 3D tablet terminal 200.

Next, the most projecting position determination unit 104 detects the greatest value of the Z coordinates of all sets of real space stereoscopic object vertex coordinates (the direction towards the near side of FIG. 8 indicates "positive" of the Z axis), and outputs, to the display control unit 105, the position at which the greatest value is detected as the most projecting position (assuming the greatest value as the greatest amount of projection) (step S705).

The display control unit 105 obtains the proper amount of projection outputted from the proper projection amount calculation unit 102, and the most projecting position (the greatest amount of projection) outputted from the most projecting position determination unit 104. Then, the display control unit 105 calculates an amount of correction of stereoscopic object position coordinates by subtracting the greatest amount of projection from the proper amount of projection (step S706).

The amount of correction of stereoscopic object position coordinates is an amount of correction to be added to the Z coordinate value of stereoscopic object position coordinates so that the amount of projection at the most projecting position is equal to the proper amount of projection if the greatest amount of projection is greater than the proper amount of projection. If the greatest amount of projection is greater than the proper amount of projection, the amount of correction of stereoscopic object position coordinates is a negative value, and the stereoscopic object translates to the negative side of the Z axis by adding that negative value to the Z coordinate value of the stereoscopic object position coordinates. This prevents a part of the stereoscopic object from projecting beyond the limited range (proper amount of projection) toward a user (to the positive side of the Z axis).

Figure 9:
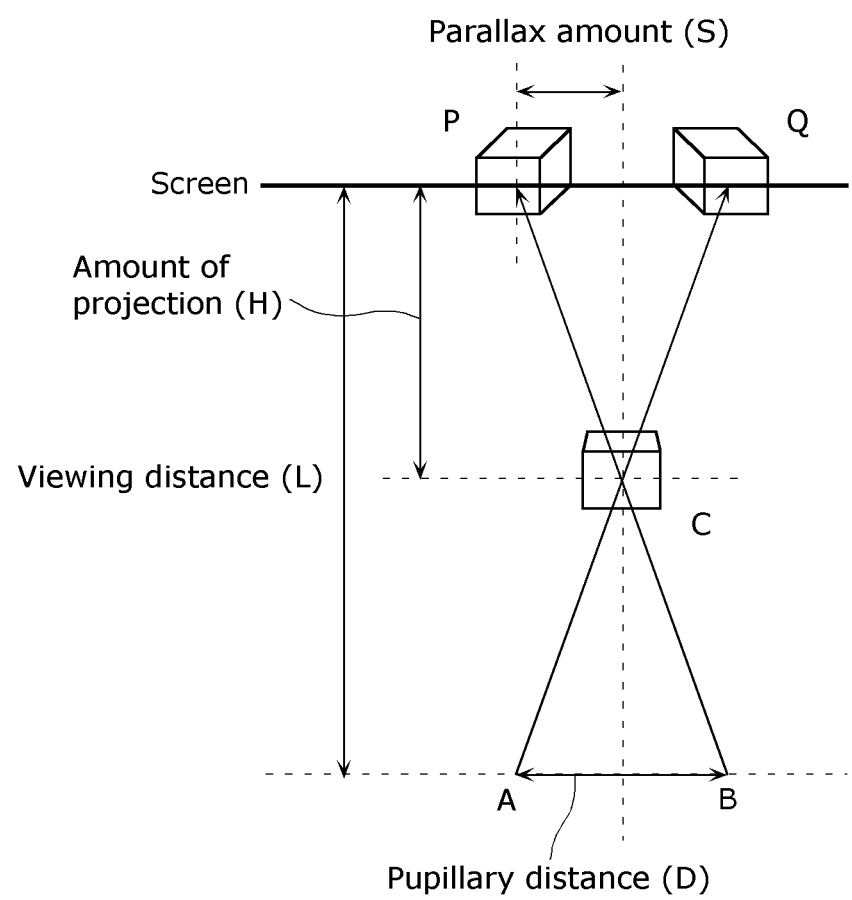
FIG. 9 illustrates a method for generating parallax images.
Figure 10:
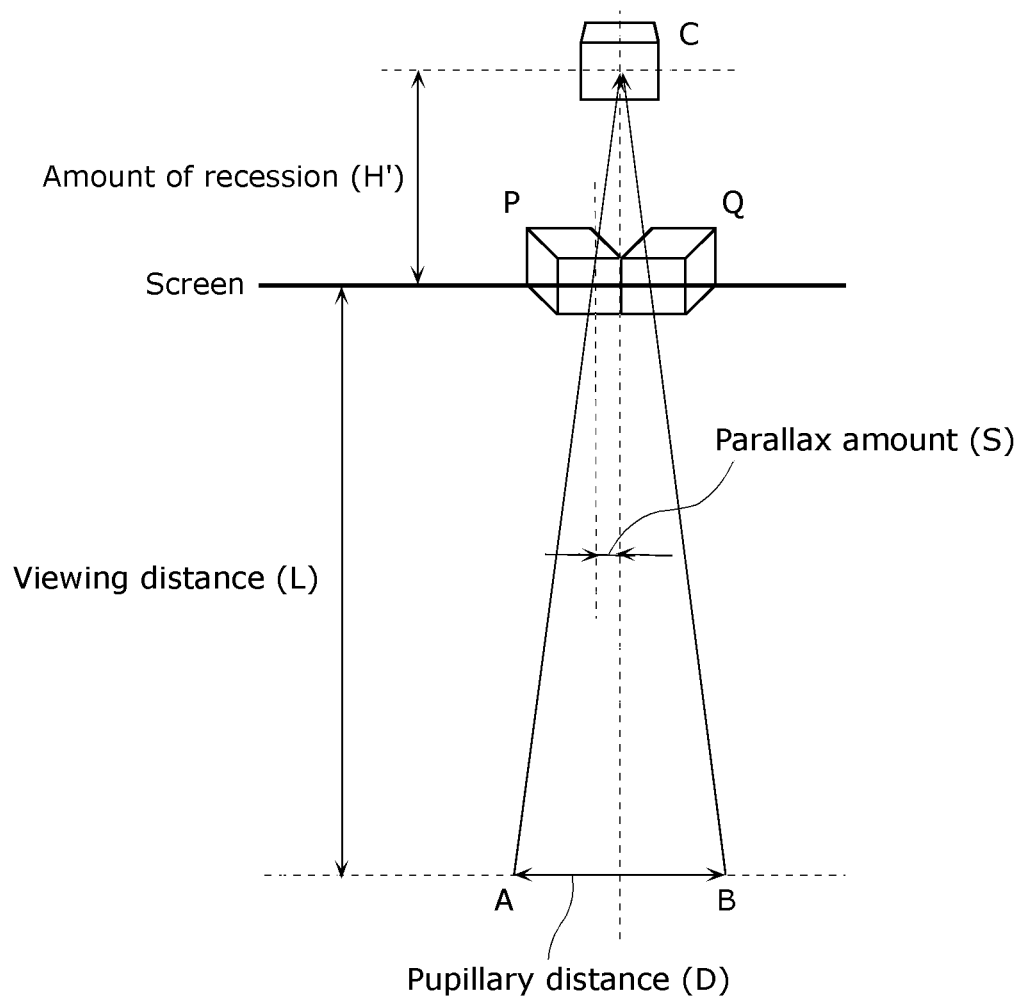
FIG. 10 illustrates the method for generating parallax images.

Next, the display control unit 105 generates right and left parallax images, based on the position of the stereoscopic object corrected using the amount of correction of stereoscopic object position coordinates, and the pupillary distance (D) and the viewing distance (L) of the user. A specific method of generating parallax images is a method of drawing parallax image Q and parallax image P for expressing stereoscopic object C viewed from view position A and view position B utilizing a graphic library such as OpenGL (registered trademark), as illustrated in FIGS. 9 and 10. Then, parallax amount S of the projecting portion is calculated using Expression 16, and parallax amount S of the receding portion is calculated using Expression 17.

[Math 16]

$$S = \frac{D \times H}{2(L - H)} \quad \text{Expression 16}$$

[Math 17]

$$S = \frac{D \times H'}{2(L + H')} \quad \text{Expression 17}$$

Next, the display control unit 105 draws parallax images P and Q which are spaced apart by parallax amounts S to the right and left using the autostereoscopic 3D display 202, based on obtained parallax amounts S as offsets on the screen from a crosspoint of the screen and a straight line which is drawn from the middle point between view positions A and B and is perpendicular to the screen. It should be noted that although each parallax amount S takes a continuous value, the pixel pitch of the autostereoscopic 3D display 202 is fixed. Thus, the drawing positions on the screen of parallax images P and Q are determined in consideration of the pixel pitch of the autostereoscopic 3D display 202.

This prevents a part of a stereoscopic object from projecting out toward a user beyond the limited range (to the positive side of the Z axis) when the stereoscopic object is operated. Specifically, as illustrated on the left and in the center of FIG. 6A, the amount of projection at the front left corner (the most projecting position) of the car before and after the enlargement remains equal to the proper amount of projection.

Now, a description is further given of details of processing for "causing the amount of projection at the most projecting position to be equal to the proper amount of projection" executed by the display control unit 105 according to the present embodiment, with reference to FIG. 5 and the drawing in the center of FIG. 6A.

First, in the example of FIG. 5, the amount of projection at the most projecting position of the object is equal to the proper amount of projection after performing image processing for causing the greatest amounts of projection and recession to be in the limited range (processing of cutting away the portion projecting beyond the proper amounts of projection).

In contrast, the example in the center of FIG. 6A is different from the example of FIG. 5 in that the display position of the object in the depth direction is adjusted (translated in the depth direction) so that the amount of projection at the original most projecting position of the object (namely, the front left corner of the car) is equal to the proper amount of projection.

Accordingly, the most projecting position determination unit 104 according to the present embodiment determines, as the most projecting position, the position of a portion of the original shape of the object to be displayed projects most when the object is displayed by the autostereoscopic 3D display 202, and determines, as the most receding position, the position of a portion of the original shape of the object to be displayed recedes most at that time. Then, the display control unit 105 adjusts the display position of the object in the depth direction so that the above amount of projection at the most projecting position determined by the most projecting position determination unit 104 is equal to the proper amount of projection.

Since the size of the enlarged stereoscopic object is not changed in accordance with the limited range, it is conceivable that a part of the stereoscopic object recedes in the direction opposite to a user (to the negative side of the Z axis) beyond the limited range, as a result of the above processing. Specifically, as illustrated in the center of FIG. 6A, a part of the car on the rear side recedes into distance relative to the proper amount of recession.

Figure 6C:
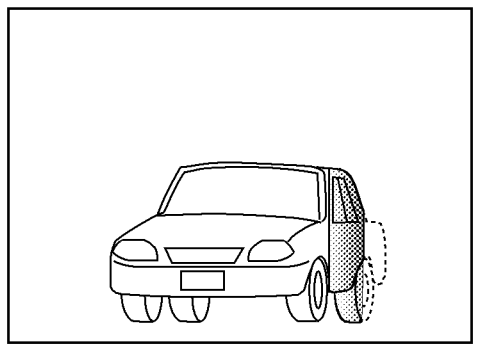
FIG. 6C illustrates a state in which the stereoscopic object in the middle in FIG. 6A is displayed as an autostereoscopic 3D object.

In such a case, it is conceivable that the display control unit 105 sets to 0 the brightness of the portion of the stereoscopic object receding in the direction opposite to the user (to the negative side of the A axis) beyond the limited range, using a graphic library, for instance, and gradually increases the brightness of the stereoscopic object in the limited range toward the user (see FIG. 6C).

Specifically, when the amount of recession at the most receding position (the left rear corner of the car in the example illustrated in the center of FIG. 6A) exceeds the proper amount of recession after causing the amount of projection at the most projecting position to be equal to the proper amount of projection (or in other words, after adjusting the display position in the depth direction), the display control unit 105 gradually decreases the brightness of the portion on the far side relative to the display surface, as the amount of recession increases (or in other words, as receding to the back) so as to lower the brightness at the position of the proper amount of recession to 0 (an example of processing by a predetermined method).

Then, the display control unit 105 displays these parallax images using the autostereoscopic 3D display 202 (step S707). Consequently, with regard to the right side (when viewed from the user) of the car displayed by the autostereoscopic 3D display 202, the brightness of a portion of the car on the far side relative to the display surface is gradually decreased toward the back, and the portion beyond the proper amount of recession is not displayed (indicated by the dashed line in FIG. 6C), as illustrated in FIG. 6C.

Figure 6D:
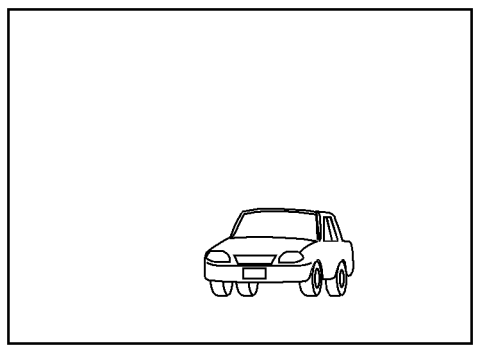
FIG. 6D illustrates a state in which the stereoscopic object on the right in FIG. 6A is displayed as an autostereoscopic 3D object.

In addition, the drawing on the right of FIG. 6A is a conceptual diagram in the case where the car is reduced in size from the state on the left in FIG. 6A, and FIG. 6D illustrates this drawing when viewed from the user side. In this case, the display control unit 105 causes the amount of projection at the front left corner of the car reduced in size (at the most projecting position) to be equal to the proper amount of projection. However, the amount of recession at the right rear corner of the car in this example (at the most receding position) does not exceed the proper amount of recession, and thus the portion of the car on the far side relative to the display surface is not processed.

In this way, the amount of projection of a stereoscopic image displayed by the autostereoscopic 3D display 202 at the most projecting position is caused to be equal to the proper amount of projection, and the portion of the stereoscopic object on the far side relative to the display surface is processed by a predetermined method if the amount of recession at the most receding position exceeds the proper amount of recession. The stereoscopic object on which the operation is reflected can thereby be displayed in such a manner that the user will not feel unnaturalness while the stereoscopic object is maintained within the limited range.

It should be noted that although the present embodiment describes an example in which the brightness of a portion of a stereoscopic object on a far side relative to the display surface is gradually decreased so as to be 0 at the position of the proper amount of recession, a method for lightening the color of a portion of the stereoscopic object outside the limited range, a method of blurring such a portion, or the like may be used.

As an example of processing a stereoscopic object, the color of the stereoscopic object may be gradually lightened toward the end of the limited range on the receding side from the display surface, so as to be transparent at the end of the limited range on the receding side. More specifically, if the amount of recession at the most receding position exceeds the proper amount of recession, the display control unit 105 gradually increases the transparency of the portion on the far side relative to the display surface as the amount of recession increases, and causes the transparency of the position at the proper amount of recession to be 100%.

In addition, as another example of processing a stereoscopic object, the stereoscopic object may be gradually blurred toward the end of the limited range on the receding side from the display surface, and merged into the background at the end of the limited range on the receding side. More specifically, when the amount of recession at the most receding position exceeds the proper amount of recession, the display control unit 105 may mix the background color into the color of a portion of the stereoscopic object on the far side relative to the display surface so that the ratio of the mixed background color gradually increases as the amount of recession increases, and is 100% at the position of the proper amount of recession.

It should be noted that although the user detection unit 101 according to the present embodiment detects the viewing distance and the pupillary distance of a user using an imaging unit (CCD or CMOS sensor) provided, for instance, at the upper part of a display unit 106, the method of obtaining the viewing distance and the pupillary distance of the user is not limited to this.

For example, the viewing distance may be a fixed value determined based on the size of the autostereoscopic 3D display 202, and the pupillary distance may be 6.5 cm which is an average pupillary distance of adults. In addition, the viewing distance may be a fixed value determined based on the size of the autostereoscopic 3D display 202, and according to input of an age from a user, the pupillary distance may be an average value for that age.

In addition, the above embodiment describes an example in which when an operation on a stereoscopic object displayed by the autostereoscopic 3D display 202 is inputted to the operation unit 103, the stereoscopic object after reflecting the operation thereon is translated so that the amount of projection at the most projecting position is equal to the proper amount of projection, and predetermined processing is performed on a portion on the far side relative to the display surface. However, the time when the display control unit 105 controls the display of a stereoscopic object is not limited to the above time.

For example, if the viewing distance between a user and the 3D tablet terminal 100 changes, the proper amount of projection and the proper amount of recession calculated by the proper projection amount calculation unit 102 change. As a result, even if there is no change in a stereoscopic object itself displayed by the autostereoscopic 3D display 202, the relationship between the stereoscopic object and the proper amounts of projection and recession may change. In view of this, even in such a case, the display control unit 105 may translate the stereoscopic object displayed by the autostereoscopic 3D display 202 so that the amount of projection at the most projecting position is equal to the proper amount of projection, and perform predetermined processing as described above on a portion on the far side relative to the display surface.

Furthermore, although the above embodiment describes, as an example, the combination 3D tablet terminal 200 which includes the stereo camera 201 and the autostereoscopic 3D display 202 as the constituent elements, the present disclosure is not limited to this. Specifically, an image captured by an external stereo camera may be obtained, or an object may be displayed by an external display device.

It should be noted that although the present disclosure has been described based on the above embodiments, the present disclosure is not certainly limited to the above embodiments. The present disclosure also includes the followings.

(1) Specifically, each apparatus described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each apparatus to achieve its functionality. Here, the computer program includes a combination of instruction codes indicating instructions to a computer in order to achieve given functionality.

A part or all of constituent elements included in each apparatus described above may include a single system large scale integration (LSI: large scale integrated circuit). The system LSI is a super multi-function LSI manufactured by integrating multiple components in one chip, and is specifically a computer system configured so as to include a microprocessor, a ROM, a RAM, and so on. A computer program is stored in the RAM. The system LSI accomplishes its functions through the load of the computer program from the ROM to the RAM by the microprocessor and the operation of the microprocessor in accordance with the computer program.

(3) A part or all of constituent elements included in each apparatus described above may include an IC card or a single module which can be attached to or detached from the apparatus. The IC card or the module is a computer system which includes a microprocessor, a ROM, a RAM, and the like. The above super-multifunctional LSI may be included in the IC card or the module. The IC card or the module accomplishes its functions through the operation of the microprocessor in accordance with the computer program. This IC card or module may have tamper resistant properties.

(4) The techniques disclosed herein may be achieved by the methods described above. In addition, these methods may be achieved by a computer program implemented by a computer, or may be implemented by a digital signal which includes a computer program.

In addition, the techniques disclosed herein may be achieved by a computer program or a digital signal stored in a computer-readable recording medium such as, for example, a flexible disk, a hard disk, CD-ROM, MO, DVD, DVD-ROM, DVD-RAM, a blue-ray disc (BD), or a semiconductor memory. Alternatively, the techniques disclosed herein may be achieved by a digital signal stored in such a recording medium.

In addition, with the techniques disclosed herein, the computer program or the digital signal may be transmitted via, for instance, data broadcasting or a network typified by electric telecommunication lines, wireless or wired communication lines, and the Internet.

In addition, the present disclosure is a computer system which includes a microprocessor and a memory, the memory may have stored therein a computer program, and the microprocessor may operate in accordance with the computer program.

In addition, another independent computer system may implement a program or a digital signal which has been stored in a recording medium and transported thereto or a program or a digital signal transported via a network or the like.

(5) The above embodiments and the above variation may be combined.

The above is a description of embodiments with reference to the drawings; however, the present disclosure is not limited to the illustrated embodiments. It is possible to add various modifications and changes to the illustrated embodiments within the scope of the claims or within the equivalent scope.

INDUSTRIAL APPLICABILITY

The stereoscopic object display device according to the present disclosure has an effect of always naturally displaying a stereoscopic object based on the proper amount of projection without limiting the size of the stereoscopic object even in the case of operating the stereoscopic object, and thus is useful for tablet terminals and the like capable of 3D display.

The invention claimed is:

1. A stereoscopic image display control apparatus for stereoscopically displaying an object within a range between proper amounts of projection and recession from a display surface of a display device, the apparatus comprising:
   a most projecting position determination unit configured to determine a most projecting position at which the object projects most from the display surface and a most receding position at which the object recedes most from the display surface; and
   a display control unit configured to cause the display device to display the object, wherein the display control unit is configured to:
   adjust a display position of the object by moving the object in a depth direction until an amount of projection at the most projecting position is equal to the proper amount of projection; and
   process, by a predetermined method, a portion of the object on a far side relative to the display surface when an amount of recession at the most receding position after adjusting the display position exceeds the proper amount of recession; and
   wherein when the display control unit processes the portion of the object on the far side relative to the display surface, the display control unit is configured to gradually increase a degree of image processing on the portion with an increase in the amount of the recession so as to prevent the portion of the object on the far side relative to the display surface from being displayed at a position of the proper amount of recession.

2. The stereoscopic image display control apparatus according to claim 1, further comprising:
   an operation unit configured to accept input of an operation on the object displayed by the display device, wherein the display control unit is configured to:
   adjust the display position of the object by moving the object in the depth direction until the amount of projection at the most projecting position of the object on which the operation accepted by the operation unit is reflected is equal to the proper amount of projection; and process, by the predetermined method, the portion of the object on the far side relative to the display surface when the amount of recession at the most receding position after adjusting the display position exceeds the proper amount of recession.

3. The stereoscopic image display control apparatus according to claim 1, wherein when the amount of recession at the most receding position exceeds the proper amount of recession, the display control unit is configured to process the object, to gradually lower brightness of the portion on the far side relative to the display surface as the amount of recession increases and cause brightness at a position of the proper amount of recession to be 0.

4. The stereoscopic image display control apparatus according to claim 1, wherein when the amount of recession at the most receding position exceeds the proper amount of recession, the display control unit is configured to process the object, to gradually increase transparency of the portion on the far side relative to the display surface as the amount of recession increases and cause transparency at a position of the proper amount of recession to be 100%.

5. The stereoscopic image display control apparatus according to claim 1, wherein when the amount of recession at the most receding position exceeds the proper amount of recession, the display control unit is configured to mix a background color into a color of the portion of the object on the far side relative to the display surface of the display device in such a manner that a ratio of the mixed background color gradually increases as the amount of recession increases, and is 100% at a position of the proper amount of recession.

6. The stereoscopic image display control apparatus according to claim 1, further comprising:
    a detection unit configured to detect a viewing distance between a viewer and the display device, and a pupillary distance of the viewer; and
    a proper projection amount calculation unit configured to calculate the proper amount of projection and the proper amount of recession, based on the viewing distance and the pupillary distance detected by the detection unit.

7. The stereoscopic image display control apparatus according to claim 1, further comprising:
    an input unit configured to accept input of an age from a viewer; and a proper projection amount calculation unit configured to calculate the proper amount of projection and the proper amount of recession, based on a size of the display surface of the display device and the age of the viewer accepted by the input unit.

8. The stereoscopic image display control apparatus according to claim 1, further comprising:
    the display device.

9. A stereoscopic image display control method for stereoscopically displaying an object within a range between proper amounts of projection and recession from a display surface of a display device, the method comprising:
    determining a most projecting position at which the object projects most from the display surface and a most receding position at which the object recedes most from the display surface; and
    causing the display device to display the object, wherein when causing the display device to display the object, a display position of the object is adjusted by moving the object in a depth direction until an amount of projection at the most projecting position is equal to the proper amount of projection; and
    wherein when the display control unit processes the portion of the object on the far side relative to the display surface, the display control unit is configured to gradually increase a degree of image processing on the portion with an increase in the amount of the recession so as to prevent the portion of the object on the far side relative to the display surface from being displayed at a position of the proper amount of recession.

* * * * *